United States Patent
Stoehr et al.

(10) Patent No.: US 10,793,057 B2
(45) Date of Patent: Oct. 6, 2020

(54) LIGHTING SYSTEM AND HEADLAMP

(71) Applicant: OSRAM GmbH, Munich (DE)

(72) Inventors: Joachim Stoehr, Giengen (DE);
Philipp Helbig, Heidenheim (DE);
Stephan Schwaiger, Herbrechtingen (DE)

(73) Assignee: OSRAM GmbH, Munich (DE)

( * ) Notice: Subject to any disclaimer, the term of this patent is extended or adjusted under 35 U.S.C. 154(b) by 305 days.

(21) Appl. No.: 15/919,230

(22) Filed: Mar. 13, 2018

(65) Prior Publication Data

US 2018/0264994 A1 Sep. 20, 2018

(30) Foreign Application Priority Data

Mar. 17, 2017 (DE) .................. 10 2017 204 527

(51) Int. Cl.
| | |
|---|---|
| *B60Q 1/04* | (2006.01) |
| *F21S 41/24* | (2018.01) |
| *F21S 41/143* | (2018.01) |
| *F21S 41/29* | (2018.01) |
| *F21S 41/265* | (2018.01) |
| *F21S 41/663* | (2018.01) |
| *F21S 41/153* | (2018.01) |
| *F21S 41/20* | (2018.01) |

(52) U.S. Cl.
CPC .......... *B60Q 1/0408* (2013.01); *F21S 41/143* (2018.01); *F21S 41/153* (2018.01); *F21S 41/24* (2018.01); *F21S 41/265* (2018.01); *F21S 41/285* (2018.01); *F21S 41/29* (2018.01); *F21S 41/663* (2018.01)

(58) Field of Classification Search
CPC .......... F21S 41/24; F21S 41/143; F21S 41/29; F21S 41/151
See application file for complete search history.

(56) References Cited

U.S. PATENT DOCUMENTS

| | | | | |
|---|---|---|---|---|
| 2008/0253144 | A1* | 10/2008 | Dolson | F21S 41/151 362/547 |
| 2011/0096562 | A1* | 4/2011 | Lambert | F21S 41/143 362/545 |

(Continued)

FOREIGN PATENT DOCUMENTS

| | | |
|---|---|---|
| AT | 514705 A4 | 3/2015 |
| WO | 2013020156 A1 | 2/2013 |
| WO | 2015018729 A1 | 2/2015 |

OTHER PUBLICATIONS

German Search Report based on application No. 10 2017 204 527.2 dated Jul. 11, 2017 (8 pages) (reference purpose only).

*Primary Examiner* — Andrew J Coughlin

(57) ABSTRACT

In various embodiments, a lighting system is provided. The lighting system includes an optical unit having a plurality of light guides which are respectively provided for at least one light source and which respectively have an input coupling face. On the output side, the light guides are connected via a common connecting portion of the optical unit, the connecting portion having an output face, pointing away from the light guides, for the light emerging from the light guides. The lighting system further includes a holding frame for the optical unit, by means of which the optical unit is fastened to a printed circuit board, having the light sources, of the lighting system.

13 Claims, 4 Drawing Sheets

(56) References Cited

U.S. PATENT DOCUMENTS

| | | | |
|---|---|---|---|
| 2014/0169014 A1* | 6/2014 | Jungwirth | F21S 41/151 362/509 |
| 2014/0204602 A1* | 7/2014 | Jungwirth | F21S 41/43 362/521 |
| 2015/0124469 A1* | 5/2015 | Krenn | F21S 41/43 362/511 |
| 2016/0195231 A1 | 7/2016 | Grötsch | |
| 2016/0273727 A1* | 9/2016 | Maier | F21S 41/24 |
| 2016/0273730 A1* | 9/2016 | Maier | F21S 41/663 |
| 2019/0063708 A1* | 2/2019 | Stoehr | F21S 41/151 |
| 2019/0204528 A1* | 7/2019 | Oshima | F21S 41/141 |

\* cited by examiner

LIGHTING SYSTEM AND HEADLAMP

CROSS-REFERENCE TO RELATED APPLICATION

This application claims priority to German Patent Application Serial No. 10 2017 204 527.2, which was filed Mar. 17, 2017, and is incorporated herein by reference in its entirety.

TECHNICAL FIELD

Various embodiments relate generally to a lighting system having at least one light source and an optical unit disposed downstream thereof. Moreover, various embodiments relate generally to a headlamp having such a lighting system.

BACKGROUND

Conventional vehicles have an adaptive driving beam (ADB) as optional equipment. To this end, use can be made of, for example, light-emitting diodes (LEDs) that are arranged in a matrix-like manner, wherein the LEDs are part of a module. Each individual LED or groups of LEDs in the module may then be separately actuatable and, as a result thereof, it is possible to dim and switch these on and off. Oncoming traffic and vehicles driving ahead, for example, are identified and masked, at least in regions, in combination with a camera system and image-processing electronics. As a result of this, it is conceivable to drive continuously with a "full beam", for example, without blinding other traffic users, particularly if certain conditions are met. In respect of the conditions, provision may be made for the vehicle to be driving outside of built-up areas and/or to have a speed of more than 50 km/h. In addition to other traffic users, it is also possible to locally mask obstacles, such as e.g. traffic signs.

It is necessary for a light image of the module with the matrix-like LEDs to be as homogeneous as possible, particularly if there is no masking, for example of other traffic users. At the same time, it is necessary to provide strong contrasts and steep gradients in order to separate a dark region—for example in the region of a masked vehicle—from a bright region, wherein the bright region should lie as close as possible to the masked vehicle. It is hard to meet these requirements with modules having comparatively few LEDs, i.e. with a comparatively poor resolution, for example if the module with the LEDs (light pixels) arranged in a matrix-like manner has fewer than 50 LEDs (light pixels) per column.

In order to meet the aforementioned requirements, use can be made of a plurality of modules, the light images of which are optically overlaid in the far field. However, this may lead to increased installation space requirements since a plurality of modules are necessary. Moreover, it is disadvantageous that an object to be masked appears at a different angle for a respective module depending on the distance from the modules. A position of the object in respect of the modules, i.e. a horizontal and vertical position and a distance, must be known accurately in order to have correct masking.

WO 2015/018729 A1 has disclosed a lighting arrangement which has one or more light sources. Disposed downstream thereof is a common light guide for guiding the emitted light to an imaging system. Using the latter, it is possible to create a spatial light image with a variable light field.

SUMMARY

In various embodiments, a lighting system is provided. The lighting system includes an optical unit having a plurality of light guides which are respectively provided for at least one light source and which respectively have an input coupling face. On the output side, the light guides are connected via a common connecting portion of the optical unit, the connecting portion having an output face, pointing away from the light guides, for the light emerging from the light guides. The lighting system further includes a holding frame for the optical unit, by means of which the optical unit is fastened to a printed circuit board, having the light sources, of the lighting system.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

The following detailed description refers to the accompanying drawings that show, by way of illustration, specific details and embodiments in which the invention may be practiced.

Various embodiments provide a lighting system and a headlamp which, from a device point of view, have a simple configuration, have a high light quality and may at least partially overcome the aforementioned disadvantages.

Figure 1:
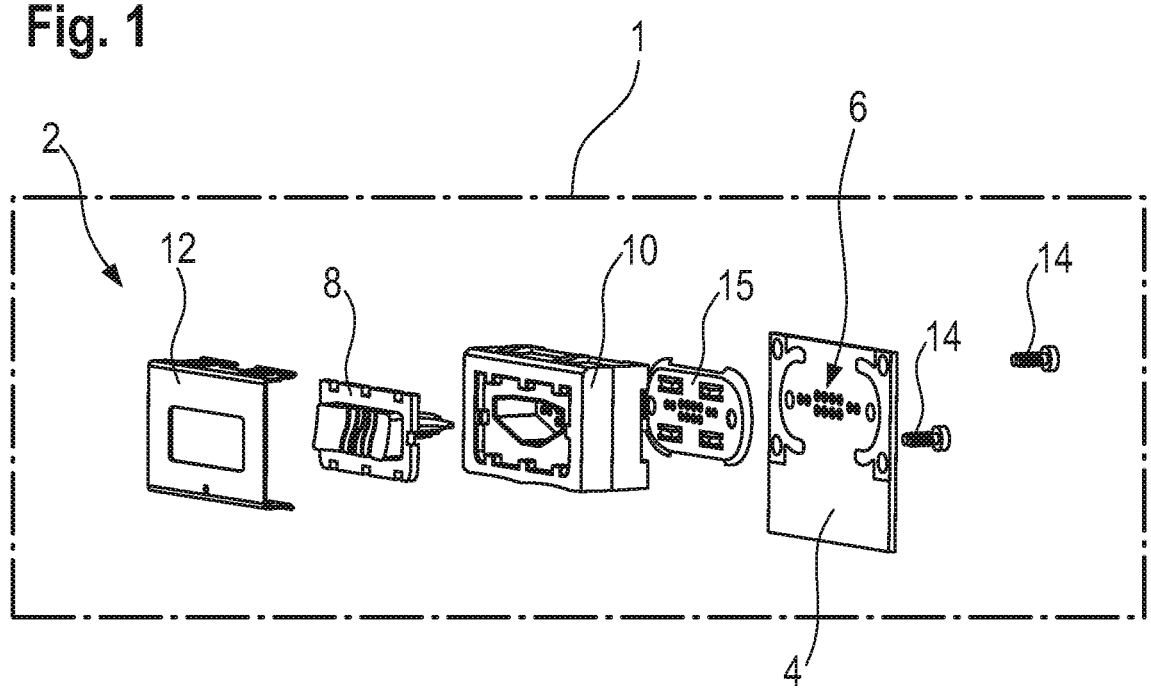
FIG. 1 shows a lighting system according to various embodiments in an exploded illustration.

According to FIG. 1, a headlamp 1 is represented in a simplified manner by means of a dashed line, said headlamp having a lighting system 2. The latter has a printed circuit board 4 with a multiplicity of light sources, arranged in a matrix-like manner, in the form of light-emitting diodes (LEDs) 6. Furthermore, the lighting system 2 has an optical unit 8 which is fastened to the printed circuit board 6 by way of a holding frame 10. The optical unit 8 is secured to the holding frame 10 by way of a clamp-shaped hold-down member 12. The holding frame 10 is anchored to the printed circuit board 4 by way of fastening elements in the form of screws 14. Furthermore, a spacer 15 for exactly positioning the optical unit 8 is arranged between the printed circuit board and the holding frame 10. Moreover, a secondary optical unit (not illustrated) is a constituent part of the headlamp 1 or of the lighting system 2.

Figure 2:
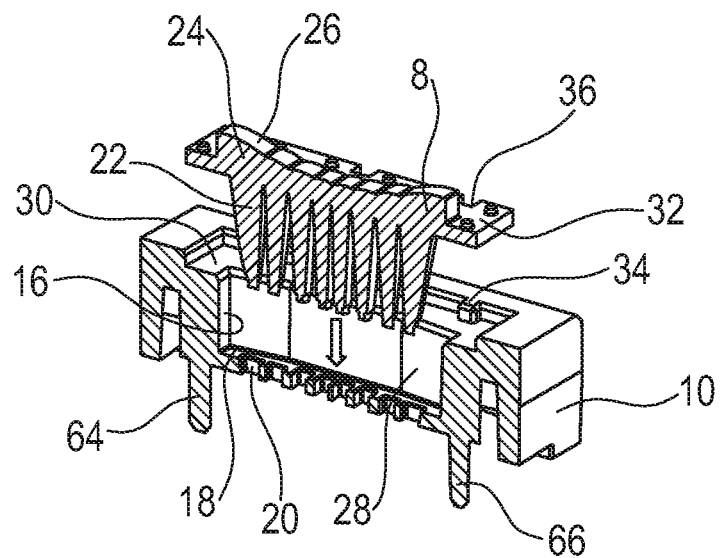
FIG. 2 shows a holding frame with an optical unit of the lighting system in a perspective sectional view.

According to FIG. 2, the holding frame 10 has a receiving space 16 for the optical unit 8, said receiving space pointing away from the printed circuit board 4. The receiving space 16 has a base side 18 in which there are a multiplicity of passage recesses 20 in the form of guides. Light guides 22 of the optical unit 8 can be guided through said passage recesses. The light guides 22 of the optical unit 8 extend approximately parallel to the main optical axis of the optical unit from a common connecting portion 24 of the optical unit 8. The connecting portion 24 has an output face 26 on its side pointing away from the light guides 22 and the holding frame 10. Respectively one LED 6 is assigned to a respective light guide 22, see FIG. 1, said LEDs then being able to couple light into the optical unit via the light guides 22. By way of the light guides 22, the light emitted by the LEDs 6 may then be brought closer together. As a result, it is possible to avoid dark regions between light paths of a respective LED 6 by virtue of the light paths through the connecting portion 24 overlapping on the edge side.

The receiving space 16 has a stepped embodiment and has a first step 28 extending from the base side 18 and a broader second step 30 adjoining the first step 28. The first step 28 serves to receive the light guides 22 and the second step 30 serves to receive a holding flange 32 embodied at the optical unit 8, said holding flange encompassing the optical unit 8 and being embodied integrally with the latter. A plurality of springs 34 are formed in the second step 30, said springs engaging in corresponding grooves 36 of the holding flange 32. As a result of this, it is possible to avoid an incorrectly oriented insertion of the optical unit 8. In the inserted state of the optical unit 8 into the holding frame 10, the holding flange 32 then is received in the second step 30 and the light guides 22 are guided through the passage recesses 20.

Figure 3:
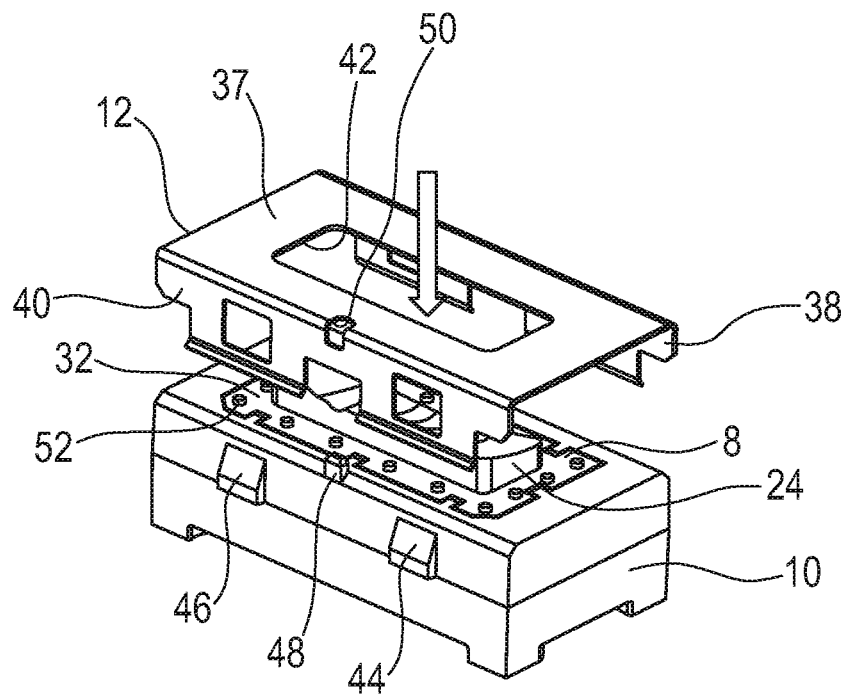
FIG. 3 shows the holding frame with the optical unit and a hold-down member in a perspective illustration.

According to FIG. 3, the hold-down member 12 is shown, by means of which the optical unit 8 is secured to the block-shaped holding frame 10. The hold-down member 12, which is approximately U-shaped in cross section, is embodied as a clamp part and has a main portion 37, from which a first limb 38 and a second limb 40 extend, said limbs being arranged approximately with a parallel distance from one another. A recess 42 is formed centrally in the main portion 37, the connecting portion 24 of the optical unit 8 being guided through said recess. The limbs 38 and 40 then reach over the block-shaped holding frame 10 on the lateral side and respectively engage with in each case two latching lugs 44, 46 embodied on the holding frame 10.

Furthermore, a centering lug 48 is provided on the holding frame 10. The former is embodied flush with a side face of the holding frame over which the limb 40 reaches. The centering lug 48 then extends approximately parallel to the main optical axis and projects from the remaining holding frame 10 in a direction away from the printed circuit board 4; see FIG. 2. Here, the centering lug 48 interacts with a centering recess 50 of the hold-down member 12, as a result of which the hold-down member 12 is arrangeable on the holding frame 10 in only one possible position, as a result of which an incorrect assembly is avoided.

Moreover, a multiplicity of abutment projections 52 are formed on the holding flange 32 according to FIG. 3. These are distributed around the circumference of the connecting portion 24 of the optical unit 8. At least when the hold-down member 12 is not placed on the holding frame 10, said abutment projections project out of the receiving space 16; see also FIG. 2. If the hold-down member 12 then is placed onto the holding frame 10, said hold-down member abuts against the abutment projections 52 with its main portion 37 and accordingly applies a holding force on the holding flange 32 via said abutment projections. The optical unit 8 then is clamped between the hold-down member 12 and the second step 30 via the holding flange 32; see also FIG. 2. In various embodiments, the holding force can be introduced in a defined manner into the holding flange 32 via the abutment projections 52.

Figure 4:
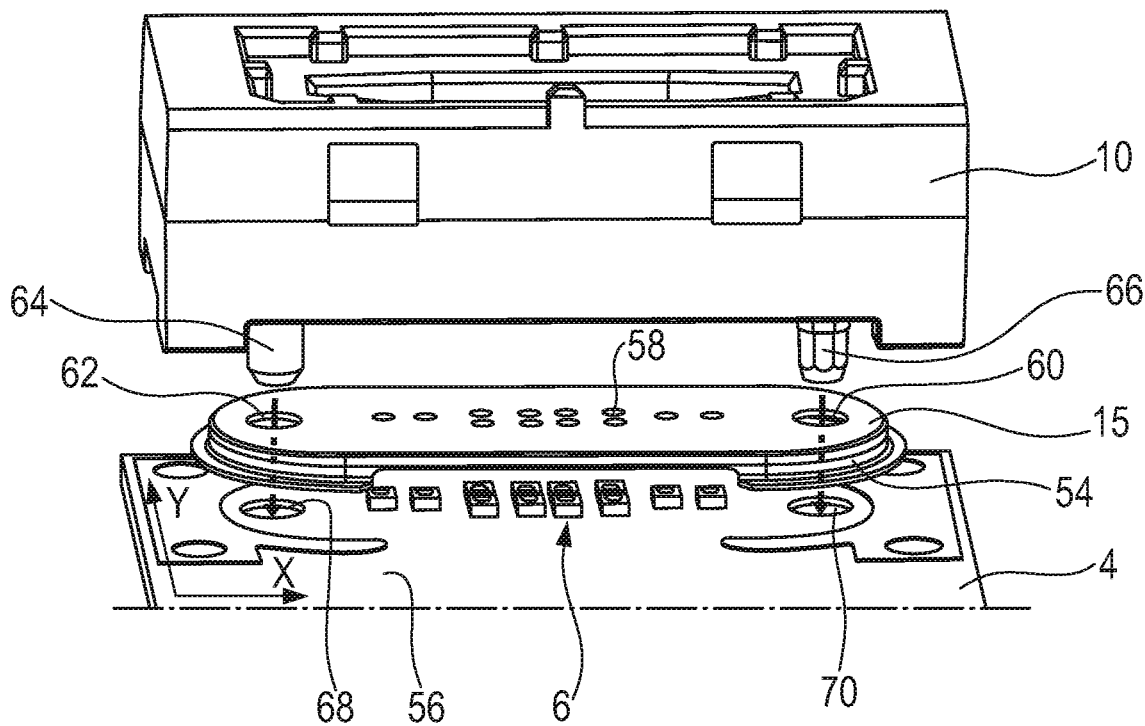
FIG. 4 shows the holding frame, a spacer and a printed circuit board in a perspective exploded illustration.

According to FIG. 4, the spacer 15 lying between the holding frame 10 and the printed circuit board 4 is shown in addition to these. The approximately plate-shaped spacer 15 has a collar 54 that, in portions, is embodied in a circumferential fashion on the side of said spacer pointing toward the printed circuit board 4. By way of said collar, the spacer 15, in the installed state, abuts against a board face 56 of the printed circuit board 4 facing the holding frame 10. Since the lacquer layer may be subject to relatively large layer thickness variations under certain circumstances, only the non-lacquered regions of the board face 56 serve as abutment faces for the spacer 15 and the holding frame 10 for reasons of tolerances (Z-alignment), said non-lacquered regions being provided to this end. Then, the LEDs 6 are arranged on the printed circuit board 4. Then, the spacer 15 lies over the LEDs 6 and it is consequently arranged between the latter and the holding frame 10. Furthermore, the LEDs 6 are arranged within the collar 54.

For a respective light guide 22, see FIG. 2, the spacer 15 has bearing openings 58; this will be explained in more detail below. Moreover, on the lateral side, the spacer 15 has two reference recesses 60 and 62, in particular in the form of continuous bores. In the assembled state, these are respectively penetrated by reference geometries in the form of reference projections 64 and 66 of the holding frame 10. According to FIG. 2, these extend to the side of the passage recesses 20 at a parallel distance from the main optical axis. Then, according to FIG. 4, two reference recesses 68, 70 are further introduced into the printed circuit board 4 for the reference projections 64 and 66, said reference projections 64 and 66 then being immersed in said reference recesses in the assembled state. Consequently, the spacer 15 and the printed circuit board 4 are referenced and positioned independently of one another in relation to the holding frame 10 by way of the reference projections 64 and 66, e.g. laterally or in the X-direction and in the Y-direction.

Figure 5A:
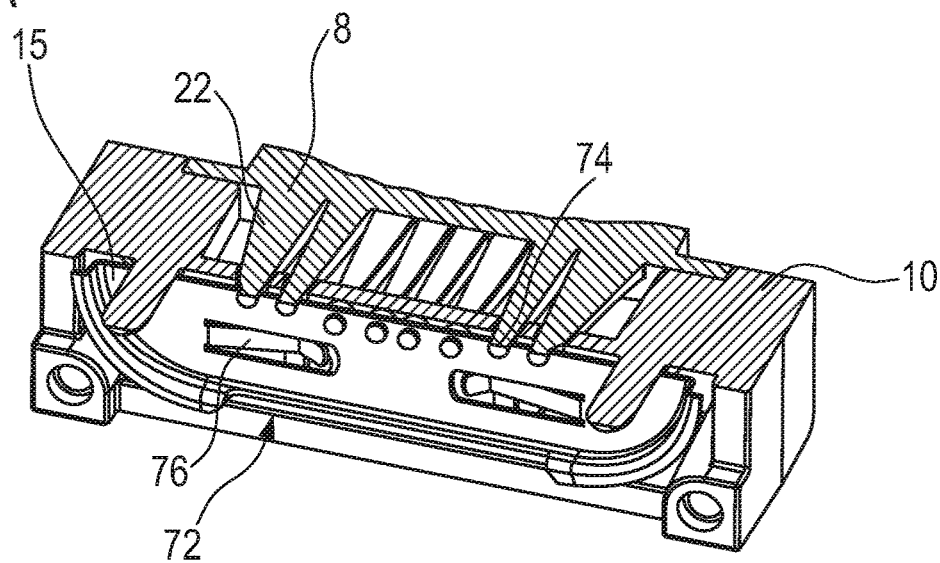
FIGS. 5A to 5D show parts of the lighting system in various views, e.g. in the region of the spacer, wherein no spacer is shown in FIG. 5C for improved clarity.

According to FIG. 5A, a connecting side 72 of the holding frame 10 is shown in a perspective sectional view, said connecting side pointing toward the printed circuit board 4; see FIG. 1, for example. Moreover, the spacer 15 and the optical unit 8 are visible. It is possible to see that the light guides 22 are each, with an end-side entry portion 74, immersed in a respective bearing opening 58 of the spacer 15 and said light guides pass through said spacer; see also FIG. 4. According to FIG. 5A, the spacer 15 has spring tongues 76, with two of four spring tongues 76 being illustrated in the sectional view according to FIG. 5A. For reasons of simplicity, these are not illustrated in FIG. 4 (sectional illustration). The spring tongues 76 each extend toward the holding frame 10 and are each supported by the latter. Then, in the assembled state, they apply a spring force on the spacer 15 in the direction of the printed circuit board 4, see FIG. 4, as a result of which an abutment of the spacer 15 on the printed circuit board 4 is ensured, even in the case of different temperatures and hence different expansions, for example of the holding frame 10.

Figure 5B:
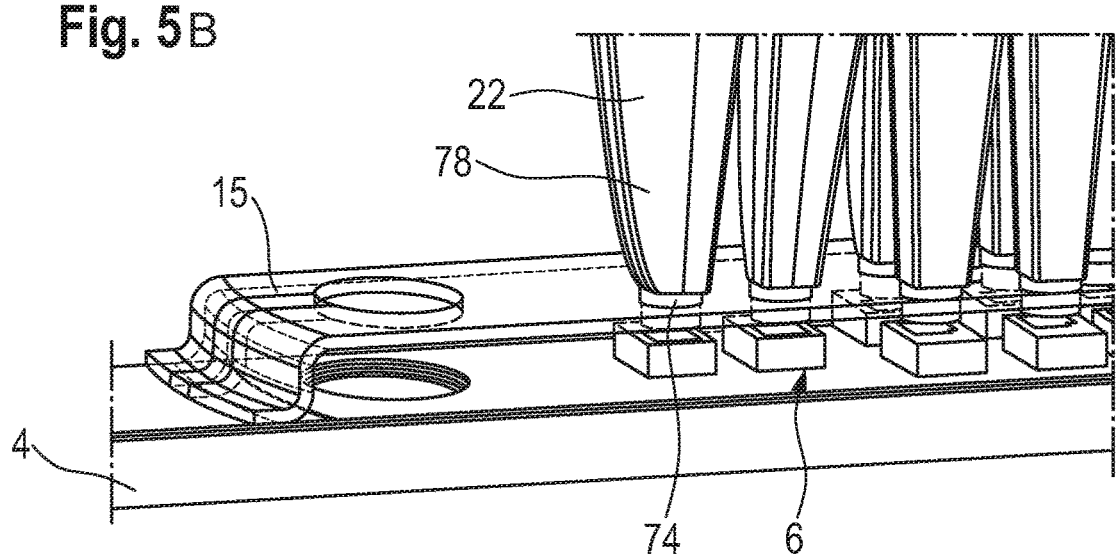

According to FIG. 5B, the printed circuit board 4, the spacer 15 and the light guides 22 are illustrated in a perspective manner and in portions. It can be seen that the end-side entry portions 74 of the light guides 22 have a circular cylindrical cross section. On their side pointing toward the LEDs 6, the entry portions 74 then each have an input coupling face. A light guide portion 78 adjoins a respective entry portion 74 by way of a step. Then, on account of the step according to FIG. 5B, a respective light guide 22 has a ring-shaped step face 80, wherein a portion of the spacer 15, of the printed circuit board 4 and of the light guides 22 is shown in FIG. 5D in a perspective illustration. By way of the step face 80, a respective light guide 22 according to FIG. 5B can be supported on the spacer 15, as a result of which an immersion depth of the entry portions 74 is restricted. Consequently, it is possible to achieve a minimum distance between the LEDs 6 and the input coupling faces of the light guides 22. The input coupling faces are shown in FIG. 5D with reference sign 82.

Figure 5C:
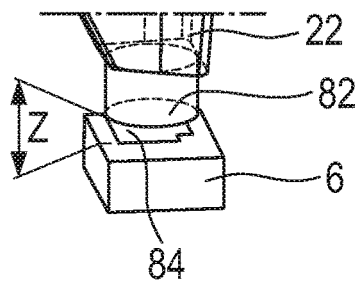
Figure 5D:
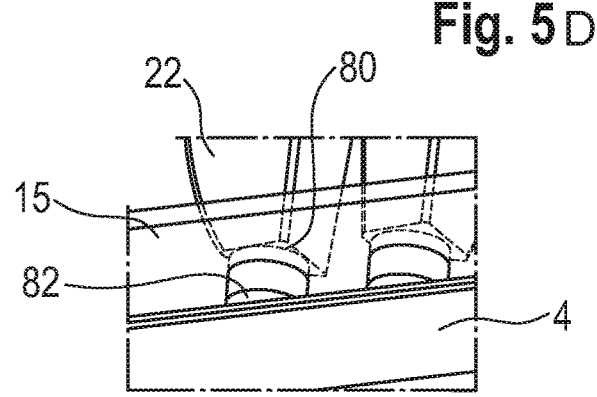

According to FIG. 5C, a distance in the Z-direction, i.e. in a direction parallel to the main optical axis of the optical unit 8 of FIG. 1, is shown between a light-emitting face 84 of an LED 6 and the input coupling face 82 of a light guide 22.

Figure 6:
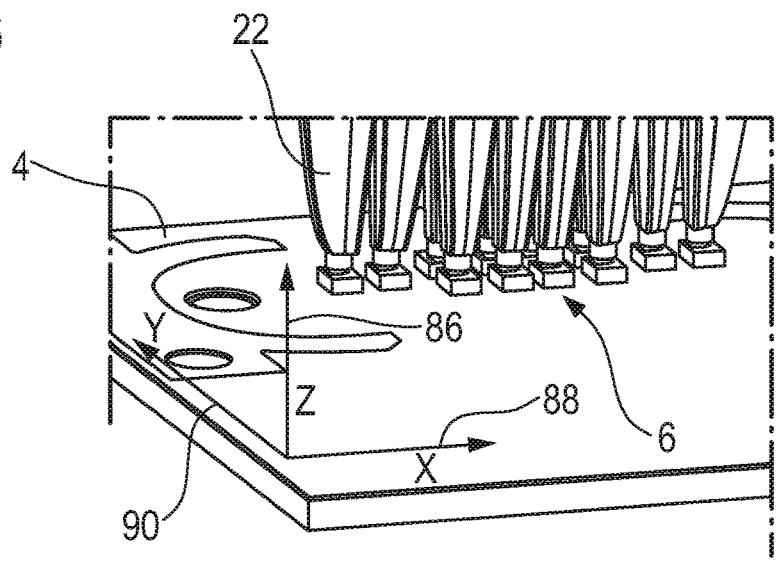
FIG. 6 shows a perspective illustration of components of the lighting system with labeling of the spatial axes.

According to FIG. 6, the printed circuit board 4 and the light guides 22 are shown in a perspective illustration. Moreover, the Z-direction 86, an X-direction 88 and a Y-direction 90 are shown. As already explained above, the Z-direction is the direction of the main optical axis of the optical unit 8 and/or a main emission direction of the LEDs 6. In the installed state of the headlamp 1 in a vehicle, see FIG. 1, the Z-direction may then, alternatively or additionally, extend parallel to the vehicle longitudinal axis. Then, the X-direction 88 can extend horizontally and the Y-direction 90 can extend vertically. According to FIG. 6, the X-direction 88 and the Y-direction 90 are provided in a plane extending parallel to the printed circuit board 4.

Figure 7:
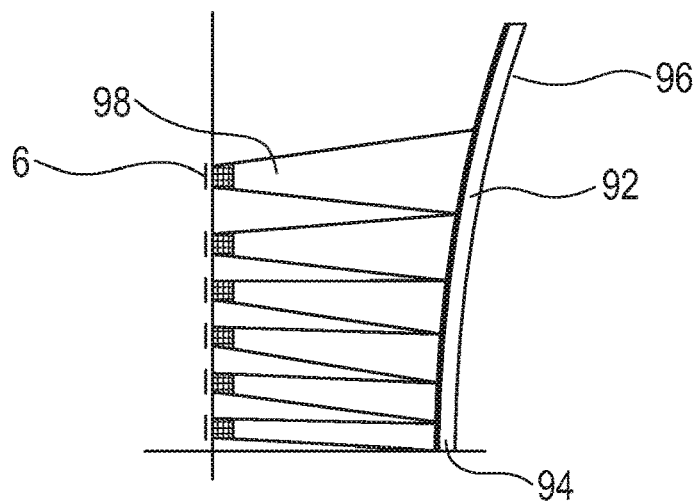
FIG. 7 shows an optical unit with light sources according to a further embodiment in a side view.

According to FIG. 7, a further embodiment of an optical unit 92 is illustrated in a much-simplified fashion. Here, a connecting portion 94 has a bent embodiment, with a concave output face 96 which may lie in, or in front of, a focal plane of a secondary lens disposed downstream thereof for the purposes of reducing an imaging aberration. The face of the connecting portion 94 pointing toward light guides 98 has, by contrast, a convex embodiment, as a result of which output faces of the light guides 98 do not lie in a common plane. According to FIG. 7, only half of the optical unit 92 is shown. Furthermore, according to FIG. 7, the LEDs 6, which lie in a common plane, are illustrated. The face, which is convex according to FIG. 7, may also have a different configuration in view of its form, for example in order to adapt a length of the light guides and/or a directional effect of the light guides. Then, the holding frame preferably has an appropriate adaptation.

Figure 8:
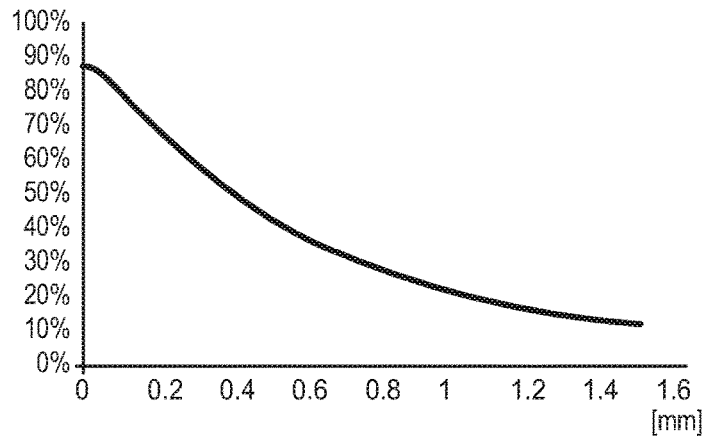
FIG. 8 shows a diagram of the efficiency of the input coupling of a light from light sources into light guides of the optical unit as a function of a distance of the light sources from the optical unit.

According to FIG. 8, the relationship between an efficiency of the input coupling of the light emitted by the LEDs 6, see FIG. 1, into the light guides 22, see FIG. 2, and a distance of the LEDs 6 from the light guides 22, e.g. a distance of the light-emitting faces 84, see FIG. 5c, from the input coupling faces 82 of the light guides 22, is identifiable. Here, the efficiency of the input coupling is plotted along the ordinate in percent and the distance in millimeters is plotted along the abscissa. It is possible to identify that the efficiency increases with decreasing distance. By way of example, at a distance of 400 µm, half of the emitted light of the LEDs 6 is not coupled into the light guides 22. Two thirds of the light are not coupled-in at a distance of 700 µm. As a result of this, the relevance of an unchanging distance becomes clear. Furthermore, the distance should be as small as possible so as to couple-in as much light as possible.

A lighting system with an optical unit is disclosed, said optical unit having a plurality of light guides which are connected. A spacer situated between printed circuit board and primary optical unit ensures a virtually constantly small distance between the light-emitting face of the light source and the light-entry face of the primary optical unit over the entire expected temperature range. The optical unit is fastened to a printed circuit board having light sources by way of a holding frame.

In various embodiments, provision is made of a lighting system having an optical unit, the latter having a plurality of light guides or tapers. These are provided in each case for light sources or radiation sources, e.g. for light sources arranged in a matrix-like manner. The light guides each have an input coupling face. On the output side, the light guides can be connected by way of a common connecting portion of the optical unit. Said common connecting portion may have an output face, pointing away from the light guides, for the light emerging from the light guides. In various embodiments, provision is made of a holding frame or lens holder for the optical unit, by means of which the optical unit is fastenable to a printed circuit board, having the light sources, of the lighting system.

This solution may provide the effect that the light guides are connected together with the connecting portion and consequently are easily fastenable and positionable on the printed circuit board by way of the holding frame. Consequently, a common positioning of the light guides in respect of the light sources of the printed circuit board may be aligned. Consequently, it is possible to anchor the optical unit and the printed circuit board, and align these precisely with respect to one another, by means of the holding frame. Moreover, light emitted by the light sources can be brought together by way of the light guides, with it then being possible, for example, for the individual light paths of the light guides to overlap, in particular on the edge side. As a result of this, a homogenous light image can be emitted in a simple manner from an apparatus point of view. If no light is guided through one light guide or through a plurality of light guides, a sharp light/dark boundary may be facilitated in the light image in relation to an adjacent light guide which has light emerging therefrom. Consequently, individual pixels are separable from one another with a high contrast on account of the light guides and, at the same time, no dark regions, or only small dark regions, are provided between the pixels. The light paths may overlap, e.g. in the common connecting portion.

Here, a pixel should be the light passing through a respective light guide, said light being couplable into the respective light guide by way of one or more light sources, for example.

The holding frame preferably has a receiving space into which the optical unit is insertable, at least in portions. Consequently, the optical unit is safely protected from external influences. By way of example, the receiving space of the holding frame is opened in a direction facing away from the printed circuit board in order to insert the optical unit.

In various embodiments, a guide can be provided in the receiving space for at least one light guide. As a result of this, the at least one light guide can be threaded and aligned by the guide geometry present when the optical unit is inserted into the receiving space. In various embodiments, a guide is provided for some of the light guides or for all of the light guides, as a result of which a simple insertion and alignment of the entire optical unit is facilitated. Consequently, the holding frame not only can be used for protecting the optical unit and for positioning the optical unit at the printed circuit board but may additionally also have a threading aid for the optical unit. The guide or a respective guide can be provided in simple terms from an apparatus point of view by way of a passage recess of a base side of the receiving space. Furthermore, the guide or a respective guide may have a guide face encompassing the lateral face of the corresponding light guide, wherein, by way of example, the guide face or a respective guide face then is at a distance from, or substantially at a distance from, the corresponding lateral face when the optical unit is in the holding frame in the inserted state so as not to have a negative influence on the optical unit.

In various embodiments, the light guides are integrally connected to the connecting portion, facilitating a simple production and assembly. The optical unit with the connecting portion and the light guides may consist at least in part or substantially entirely or entirely of silicone; however, other transparent materials such as polymethyl methacrylate (PMMA), polycarbonate (PC) or glass are also conceivable, e.g. depending on a distance, a specific form of the optical unit and a radiation intensity/luminance of the LEDs. The light guides may project away from the connecting portion and may each have a lateral face for light guidance, as a result of which there is no additional cladding necessary, as is conventional in the case of light guides for data transfer, for example. Consequently, the respective lateral face is simply the interface between the material of the optical unit and of the surroundings (air), for example. In various embodiments, the input coupling faces of the light guides extend transversely to the main optical axis of the optical unit.

In various embodiments, a hold-down member or a clamp may be fastened to the holding frame, by means of which the optical unit can then easily be held in the receiving space. The hold-down member may be embodied as a clamp part in a simple manner from an apparatus point of view, said clamp part reaching over the holding frame and, in the process, securing the optical unit. Firstly, such a clamp part is easily producible and, secondly, it is easily assemblable by virtue of it simply being clamped onto the holding frame. It is conceivable for the hold-down member to have an approximately U-shaped cross section. It may then have a main portion, which abuts against the optical unit and, moreover, have two limbs which then extend away from the main portion. Then, the hold-down member can reach over the holding frame, which has e.g. a block-shaped configuration, by means of the limbs. In a simple manner from an apparatus point of view, the main portion of the hold-down member has a recess through which the optical unit, e.g. the connecting portion with the output face, is subsequently guided. By way of example, the limbs of the hold-down member each have at least one recess, into which a respective latching lug of the holding frame can engage in order to anchor the hold-down member. Alternatively, or additionally, provision can be made for the hold-down member to have one latching lug on each of its limbs, said latching lug then being able to engage in a corresponding recess of the holding frame.

In various embodiments, the holding frame has at least two latching lugs for a respective limb, wherein a total of at least four latching lugs may be provided. Accordingly, a respective limb may then have at least two recesses, as a result of which secure anchoring of the hold-down member is facilitated. The latching lug or a respective latching lug may have a ramp so that the hold-down member can easily be guided thereover with its limbs.

In various embodiments, the optical unit is encompassed by an embodied holding flange, e.g. integrally embodied holding flange. By way of the latter, said optical unit can then easily be supported on the holding frame. Then, it is conceivable for the receiving space of the holding frame to have a stepped configuration to this end, with the light guides being arranged in a first smaller step and the flange portion then being supported in the second broader step. Then, the hold-down member can engage on the flange face of the holding flange which points in the same direction as the output face in order to apply a holding force onto the optical unit. Consequently, the light guides and the connecting portion are not directly exposed to the holding force since the latter is applied to the holding flange. Furthermore, there may be no negative optical influence of the hold-down member as a result thereof, since the latter only covers the flange portion and the optical unit is otherwise not covered by the hold-down member.

At least one abutment projection may be formed on the flange face of the optical unit, said abutment projection preferably pointing in a direction away from the holding frame and consequently having a certain resilient effect in order, for example, to counteract an overdefinition. Then, the hold-down member, e.g. the main portion of the hold-down member, may engage on the latter in order to tension the optical unit against the holding frame. Consequently, the holding force is applied onto the optical unit by means of the at least one abutment projection via a point load. In various embodiments, a plurality or multiplicity of such abutment projections are provided, the latter being distributed in a circumferential manner about the flange face, for example. The at least one abutment projection or the abutment projections have e.g. a conical-frustum-shaped configuration, with them being able to taper in a direction away from the optical unit. Providing a different geometry and/or a different arrangement of the at least one abutment projection or of the abutment projections is also conceivable. The abutment projection or the abutment projections may be configured as springs that act on the point. By way of the hold-down member, the optical unit may be connected to the holding frame in a force-fit and interlocking manner.

In various embodiments, the holding frame moreover has a centering lug which engages in a corresponding centering recess of the hold-down member in order to prevent an incorrectly oriented or twisted assembly of the hold-down member. By way of example, the centering lug extends simply along the end face of the holding frame in a direction away from the printed circuit board and may be provided adjacent to the receiving space. By way of example, the centering recess is provided at the main portion and/or at one of the limbs. By way of example, it may be introduced in the transition region from the main portion to the limb. The centering lug of the holding frame and the centering recess of the hold-down member may consequently be a so-called "poka-yoke" and consequently be a technical provision or a device for preventing errors.

In various embodiments, provision is made of a spacer for the optical unit. Said spacer may be arranged at a connecting side of the holding frame which points away from the output face of the optical unit, i.e. which is provided opposite to the output face, and via which the holding frame is connectable to the printed circuit board. By way of the spacer, a defined distance may be formed between the optical unit and the printed circuit board so that the lighting system has a light image with a high efficiency and an unchanging quality. In various embodiments, the spacer is configured in such a way that at least one light guide or at least some of the light guides is/are positioned exactly in relation to the opposing light-emitting faces of the assigned light sources. Moreover, the spacer may be configured in such a way that the holding frame and/or the optical unit are protected and shielded from non-input-coupled light, with the spacer then being able to fulfill the function of a stop. Consequently, the risk of light not actively contributing to the light distribution causing unwanted effects as stray light is minimized.

In various embodiments, the spacer has a continuous bearing opening for at least one light guide or for at least some of the light guides, e.g. for the entry portions thereof. As a result of this, the corresponding light guide may then be mounted and positioned transversely to the main optical axis of the optical unit or transversely to the main emission direction of the light sources, for example. In various embodiments, the bearing opening is adapted to the corresponding light guide or to the corresponding entry portion of the light guide. Consequently, the lateral face of the entry portion of a respective light guide and the respective bearing opening may have the same cross section, e.g. approximately the same cross section. Consequently, the faces may be adapted to one another in order to facilitate accurate positioning of the light guides transversely to the emission direction of the light sources. In various embodiments, provision may be made for there to be play between the respective bearing opening and the corresponding light guide. In various embodiments, the light guide is radially spaced apart from the bearing opening assigned thereto.

In various embodiments, as already mentioned above, an entry portion with the input coupling face is provided in at least one light guide or at least some of the light guides. This portion or portions has or have e.g. a circular cylindrical or approximately circular cylindrical configuration. Then, a light guide portion can adjoin the entry portion or a respective entry portion, said light guide portion preferably broadening between the entry portion and the connecting portion, i.e. possibly representing a step in the light guide, wherein the light guide portion is then able to broaden in the radiation direction. In this way, the light guide can be "supported" on the spacer and the distance between the light source and light guide can be set and maintained in a precise manner. Consequently, the entry portion may facilitate bearing, referencing and positioning in the spacer (particularly in all three spatial directions), with free forming and steering of the light then being facilitated in the light guide portion. In addition to the cylindrical or circular cylindrical configuration, other geometries are also conceivable, for example entry portions and/or bearing openings with elliptical, rectangular, polygonal, n-gonal or free-form cross sections.

In a further configuration of the invention, the spacer has a main portion having, by way of example, the at least one bearing opening. A collar pointing away from the optical unit can then extend from said main portion, the spacer being supported on the printed circuit board by way of said collar. Then, the spacer has a defined distance from the printed circuit board by way of the collar. The light sources of the printed circuit board may be provided opposite to the main portion.

At least one light guide or at least some of the light guides may have a step with a step face pointing toward the spacer at the transition between the entry portion and the light guide portion. Here, the step face may have a ring-shaped or substantially ring-shaped embodiment and encompass a respective light guide, with it also being conceivable to embody the circumference of a step face in an elliptical, rectangular, trapezoidal or free-form fashion. By way of this step face or these step faces, the light guide or a respective light guide can be supported on the spacer. Consequently, an immersion only up to a set depth may advantageously be allowed by way of the step face or by way of the defined geometric transition face at each individual light guide since the step face can rest on the base plate, e.g. in a plane or planar fashion, after a certain immersion depth of the light guide or of the light guides into the corresponding bearing opening. A further immersion and a reduction in the distance between the input coupling faces and the emitting faces of the light sources, connected therewith, are consequently not possible, as a result of which a minimum distance is achieved. Consequently, it is also possible to prevent a reduction in the distance between light guide and light source on account of the thermal expansion of the light guides, for example if the latter consist of silicone, by way of the step face abutting on the spacer. If, for example, the light guides then abut on the spacer and there is a further thermal expansion, it is conceivable for the light guides to experience slight compression, which is then absorbed by the material of the light guides, in particular by the silicone material, and the geometry. This leads to displacement of the thermally caused changes in geometry into regions which are less critical from an optical point of view. Expressed differently, direct resting of the input coupling faces of the light guides on the light-emitting faces of the light sources can be avoided even in the case of great thermal expansion, as a result of which further undefined, changing input coupling effects and hence a light distribution that varies over the temperature range are avoided.

The step face preferably reaches completely or substantially completely around the associated light guide and moreover rests against the spacer, preferably entirely or substantially entirely—e.g. above a certain temperature or within a temperature range to be expected—as a result of which an unchanging orientation of the input coupling face is ensured. If an abutment is provided within the temperature range to be expected, provision can further be made for an abutment of the step face to be effectuated under pretension in the expected temperature range. This may be provided since the light guide is always abutting and always has a defined distance from the light source. By contrast, if the step face would only abut at one point, for example, the input coupling face could be twisted in respect of the point, for example, in the case of thermal expansion of the optical unit, as a result of which the orientation thereof could change. Consequently, an angle position of the input coupling face relative to the light-emitting face of the associated light source may remain constant, e.g. parallel; this may have an effect on the efficiency of the optical unit. Consequently, the optical unit can have an extremely high efficiency in combination with the accurate positioning transversely to the main emission direction of the light sources and/or transversely to the main optical axis. Consequently, it is possible to determine that the input coupling faces of the optical unit are mechanically positionable in an ideal fashion in relation to the light-emitting faces in an unchanging manner over the entire temperature range to be expected.

In various embodiments, the spacer has a spring, said spring facilitating said spacer to be able to be supported on the holding frame and rendering possible an application of a spring force on said spacer in the direction of the printed circuit board. This ensures a secure abutment of the spacer on the printed circuit board, even in the case of temperature variations and geometric changes of the components of the lighting system emerging therefrom. In a simple manner from an apparatus point of view, the spring is embodied as a spring tongue on the spacer. In various embodiments, two, three, four or more springs or spring tongues are provided to provide a sufficient spring force. In various embodiments, the springs are arranged in a distributed manner on the spacer in order to apply the spring force uniformly on the latter. Expressed differently, the spring tongues embodied on the spacer ensure that there is a uniform and vibration-secured abutment on the printed circuit board surface over the entire temperature range to be expected.

Moreover, the spacer can have a precisely produced aperture arrangement for the light guides, wherein a respective aperture then has a defined diameter and a defined positioning transversely to the main optical axis or in an XY-plane. Moreover, the spacer may have an exactly defined height. Expressed differently, it is consequently possible for at least one defined minimum distance to be facilitated in the direction of the main optical axis or in a Z-direction. In order to ensure a desired maximum distance, e.g. in the case of low temperatures, the (silicone) optical unit may be installed with appropriate excess length. Consequently, a "material length" may be kept available for temperature-induced shrinkage.

Consequently, the spacer facilitates, overall, an exact positioning of the light guides relative to the light-emitting faces of the light sources in the X-direction, Y-direction and Z-direction.

In various embodiments, the material of the spacer is adapted to the material of the printed circuit board, in particular by virtue of these materials having similar or the same or substantially the same physical properties. As a result of this, these components may have the same effect in terms of their physical properties during operation and do not act to the detriment of one another. By way of example, it is conceivable for a coefficient of thermal expansion of the spacer to be adapted to the coefficient of thermal expansion of the printed circuit board or for these to be the same or substantially the same. Consequently, in the case of thermal changes in respect of the light sources provided at the printed circuit board, the individual light guides of the optical unit are updated, e.g. transversely to the main optical axis or in an XY-plane. Expressed differently, the spacer may have a similar or the same thermal expansion as the printed circuit board material. In various embodiments, the spacer consists at least in part or substantially entirely or entirely of steel, e.g. of stainless steel, with this being a material usually having a similar thermal expansion to that of the printed circuit board material. Moreover, this material is not light transmissive, as a result of which the function of the spacer as a radiation shield is likewise easily implementable.

In various embodiments, the spacer is configured in a cost-effective manner as a deep drawing part. Furthermore, it is conceivable to embody the holding frame as a molded part, in particular as a polymer injection molded part. Then, the spacer may form an inlay, as a result of which an inlay molding method may be facilitated, leading to a simplification of the assembly. Alternatively, it is conceivable to design the spacer in an integral manner or as one part with the holding frame, or to combine said spacer with the latter. Here, a material having sufficient resistance against occurring irradiance may be provided for the spacer and the holding frame. Alternatively, the relevant regions of the employed material may be protected by way of a radiation-resistant coating or a metallization.

In various embodiments, the spacer is configured in such a way that the input coupling faces of the light guides are spaced apart from the light sources in the relevant or expected temperature range, in particular between −40° Celsius and +125° Celsius.

In various embodiments, the optical unit and the holding frame can be manufactured in a combined manner, for example by an overmolding method. Consequently, it is possible, for example, to initially form the optical unit as an injection molded part (pre-molded part) and the latter can then be overmolded with a second melt in the subsequent method step, said second melt then being able to form the holding frame.

As explained above, the optical unit and the holding frame and/or the holding frame and the spacer, for example, may be produced in a multi-component injection molding method. It is also conceivable to embody the optical unit and the holding frame and/or the holding frame and the spacer as individual components.

In various embodiments, the printed circuit board has a plurality of light sources in the form of light-emitting diodes (LEDs). An LED may be present in the form of at least one individually packaged LED or in the form of at least one LED chip having one or more light-emitting diodes. A plurality of LED chips may be assembled on a common substrate ("submount") and may form an LED, or may be fastened, either individually or together, on a printed circuit board (e.g. FR4, metal core printed circuit board, etc.) ("CoB"=chip on board), for example. The at least one LED may be equipped with at least one dedicated and/or common optical unit for beam guidance, for example with at least one Fresnel lens or collimator. In place of, or in addition to, inorganic LEDs, for example on the basis of AlInGaN or InGaN or AlInGaP, use can also be made, in general, of organic LEDs (OLEDs, e.g. polymer OLEDs). The LED chips may emit directly or have a phosphor disposed upstream thereof. Alternatively, the light-emitting component may be a laser diode or a laser diode arrangement. It is also conceivable to provide an OLED luminous layer or a plurality of OLED luminous layers or an OLED luminous region. The emission wavelengths of the light-emitting components may lie in the ultraviolet, visible or infrared spectral range. Additionally, the light-emitting components may be equipped with a dedicated converter. In various embodiments, the LED chips emit white light in the standardized ECE white field of the automotive industry, for example realized by way of a blue emitter and a yellow/green converter. The LEDs may be arranged on a board face of the printed circuit board facing the optical unit. The LEDs of the printed circuit board may be arranged in a matrix-like manner, wherein a respective LED may be assigned to a respective light guide. However, it is also conceivable that a plurality of LEDs are assigned to one light guide. By way of example, the printed circuit board is a metal core printed circuit board (MCPCB) or a printed circuit board with a thermally conductive core (a so-called "inlay"), such as, for example, a so-called FR4 printed circuit board with a copper core or a core made of another material, or printed circuit boards which are produced entirely from other materials such as aluminum nitride (AlN), for example. Additionally, electronic components and assemblies may be provided on the printed circuit board.

In various embodiments, provision can be made for the step faces of the light guides to abut against the spacer at a certain temperature, e.g. at room temperature, and for a tensioning force to be additionally applied to the light guides. If the temperature drops, the light guides continue to abut against the spacer. Expressed differently, provision can be made for the optical unit to be installed with a defined excess length, e.g. when using the lighting system in a vehicle with an expected low negative temperature in combination with the coefficient of thermal expansion of the optical unit consisting of silicone, for example. In various embodiments, this means that the step faces abut against the spacer with pressure at a certain temperature, e.g. at room temperature. This ensures that there is no increase in the spacing between the input coupling faces of the light guides and the light-emitting faces of the light sources in the case of a coldness-induced shrinkage of the optical unit. Alternatively, provision can be made for the step faces of the light guides to abut against the spacer and for little, or no, tensioning force to be applied on said light guides at a certain temperature, e.g. at room temperature. In various embodiments, the magnitude of the tensioning force is designed such that the distance between the LEDs and the light guides is increased at lower temperatures, in which the LEDs typically become brighter, resulting in the optical unit in turn becoming less efficient. As a result of this, these effects compensate one another and the resultant luminous flux remains approximately constant.

In various embodiments, a respective step face of the light guides is supported in a two-dimensional and/or a planar manner on a surface of the spacer. As a result of this, the parallelism between the input coupling faces of the light guides and the light-emitting faces of the light sources may be at least largely ensured. In various embodiments, the surface of the spacer is configured to be parallel to the respective step face, at least in the region of the respective step face. In various embodiments, the surface of the spacer and a respective step face may be planar and/or adapted to one another, at least in the region of the respective step face, wherein, for example, a curved configuration of the faces of the spacer and of the light guides is also conceivable. Consequently, the faces abutting against one another may be e.g. planar or adapted to one another, for example by virtue of having the same curvature. In a further configuration of the invention, it is conceivable for a respective light guide to be able to have a plurality of step faces in order to vary the tensioning force or the spring force in a temperature-dependent manner. The surface of the spacer may then have an appropriate configuration, at least in the region of the respective step faces. Consequently, a multiple step is also conceivable in the respective light guide.

In various embodiments, at least one reference geometry is configured on the holding frame or on the printed circuit board. Said reference geometry passes through e.g. one reference recess, e.g. a continuous reference recess, of the spacer. Furthermore, the reference geometry can be immersed in a reference recess of the printed circuit board or of the holding frame, depending on whether it is configured on the holding frame or on the printed circuit board. Consequently, a tolerance chain is significantly reduced on account of the reference geometry. By way of the reference geometry, the holding frame with the optical unit inserted therein and the spacer may be positioned and referenced in respect of the printed circuit board with its individual light sources. Consequently, positioning transversely to the main optical axis and/or transversely to the main emission direction of the light sources, e.g. in the XY-plane, may be effectuated, for example, by way of the reference geometry. Then, the optical unit is simply referenced by way of the spacer. In various embodiments, the reference geometry is inserted into the printed circuit board or the holding frame by way of a plug-in assembly.

In various embodiments, the reference geometry may be configured as a reference projection, e.g. a cylindrical reference projection. Other geometries are also possible, for example a triangular, quadrilateral, hexagonal, polygonal, oval or free-form geometry.

Said reference projection may extend away from the holding frame, e.g. parallel to the main optical axis of the optical unit and/or the main emission direction of the light sources. Alternatively, the reference projection may also extend away from the printed circuit board. It is simple to produce such a reference projection. By way of example, the reference recess of the spacer is designed, in a simple manner from an apparatus point of view, as a bore which may be introduced with tight tolerances. For the purposes of receiving the reference projection, the printed circuit board or the holding frame preferably likewise has a bore which is simple from an apparatus point of view and which can be formed with tight tolerances. Consequently, the reference geometry can pass through the bores, provided with tight tolerances, of the spacer and the printed circuit board or the holding frame, as a result of which the tolerance chain is significantly reduced. In various embodiments, provision is made of two parallel reference projections, which each pass through a respective reference recess of the spacer and each are immersed in a respective reference recess of the printed circuit board or of the holding frame. In various embodiments, the light guides are guided between the reference recesses of the spacer through the latter.

Expressed differently, both the printed circuit board and the spacer may be referenced to the same reference, namely the holding frame, instead of e.g. referencing the holding frame in relation to the spacer and referencing the spacer in relation to the printed circuit board. Consequently, the tolerance chain arising from the individual components is minimized on account of the use of reference geometries.

In various embodiments, the holding frame has a plurality of abutment projections, e.g. corner-side abutment projections, on its connecting side facing the printed circuit board in a further configuration. Depending on the size and arrangement possibilities, just two or three abutment projections are also implementable instead of four (or more). Using these, said holding frame can abut against the printed circuit board and moreover be fastened to the printed circuit board by way of these using fastening means such as screws, for example.

In various embodiments, the components of the lighting system, e.g. the optical unit, the spacer and the printed circuit board, can be anchored easily from an apparatus point of view and can be precisely aligned in relation to one another with the aid of the holding frame.

In various embodiments, provision is made of a headlamp or a headlamp module having a lighting system according to one or more of the preceding aspects. By way of example, the optical unit then is a primary optical unit. Additionally, provision can be made of at least one secondary optical unit, which is disposed downstream of the primary optical unit.

In various embodiments, the headlamp is provided in a vehicle. Large temperature variations may occur in the vehicle, said temperature variations having no influence, or hardly any influence, on the efficiency and quality of the emitted light image as a result of the headlamp according to various embodiments. By way of example, the lighting system in the headlamp can be used for a driving beam or an auxiliary driving beam, e.g. for an adaptive driving beam (ADB).

Furthermore, provision can be made for the headlamp to be embodied as a matrix headlamp. Consequently, it can fulfill all the functions of an adaptive driving beam. By way of example, each individual light source or groups of light sources in the form of one/more LED(s) may then be actuated separately and, as a result, be switched on and off and dimmed, in the lighting system, which may be configured as a module. In combination with a camera system and image-processing electronics and/or a different sensor system, it is possible to identify oncoming traffic and vehicles ahead and these may be masked on a region-by-region basis. In the case of a correspondingly large pixel number, it is moreover conceivable to separately illuminate objects identified by the camera system, such as pedestrians, animals or obstacles, and consequently draw the driver's attention thereto.

The vehicle may be an aircraft or a water-bound craft or a land-bound vehicle. The land-bound vehicle may be a motor vehicle or a track vehicle or a bicycle. The use of the vehicle headlamp in a truck or automobile or motorcycle may be suitable. Furthermore, the vehicle may be configured as an autonomous or partly autonomous vehicle.

Further fields of application may include, for example, spotlights for effect lighting, entertainment lighting, architainment lighting, general lighting, medical and therapeutic lighting, horticulture, etc.

LIST OF REFERENCE SIGNS

Headlamp 1
Lighting system 2
Printed circuit board 4
LED 6
Optical unit 8; 92
Holding frame 10
Hold-down member 12
Screws 14
Spacer 15
Receiving space 16
Base side 18
Passage recess 20
Light guide 22; 98
Connecting portion 24; 94
Output face 26; 96
Step 28, 30
Holding flange 32
Spring 34
Groove 36
Main portion 37
Limb 38
Limb 40
Recess 42
Latching lug 44, 46
Centering lug 48
Centering recess 50
Abutment projections 52
Collar 54
Board face 56
Bearing opening 58
Reference recess 60, 62, 68, 70
Reference projection 64, 66
Connecting side 72
Entry portion 74
Spring tongue 76
Light guide portion 78
Step face 80
Input coupling face 82
Light-emitting face 84
z-direction 86
x-direction 88
y-direction 90

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A lighting system, comprising:
an optical unit comprising a plurality of light guides which are respectively provided for at least one light source and which respectively have an input coupling face, and wherein, on the output side, the light guides are connected via a common connecting portion of the optical unit, the connecting portion having an output face, pointing away from the light guides, for the light emerging from the light guides; and
a holding frame for the optical unit, by means of which the optical unit is fastened to a printed circuit board, having the light sources, of the lighting system;
wherein a spacer arranged at a connecting side of the holding frame is provided for positioning the optical unit, the connecting side pointing away from the output face of the optical unit and the holding frame being connectable to the printed circuit board via the connecting side; and
wherein a collar extends away from the spacer, the collar supporting the spacer on the printed circuit board.

2. The lighting system of claim 1,
wherein the holding frame has a receiving space into which the optical unit is insertable, at least in portions, and
wherein a guide is provided in the receiving space for at least one light guide.

3. The lighting system of claim 2,
wherein a hold-down member is fastened to the holding frame, the hold-down member anchoring the optical unit in the receiving space,
wherein the hold-down member is embodied as a clamp part which reaches over the holding frame.

4. The lighting system of claim 3,
wherein the optical unit is encompassed by a holding flange, by means of which the optical unit supports itself on the holding frame,
wherein at least one abutment projection is embodied on the holding flange, the hold-down member tensioning the optical unit against the holding frame by way of said holding flange.

5. The lighting system of claim 1,
wherein the spacer has a continuous bearing opening for a respective light guide of the optical unit.

6. The lighting system of claim 1,
wherein the printed circuit board has a plurality of light sources arranged in a matrix-like manner, in the form of light-emitting diodes.

7. The lighting system of claim 1, further comprising:
a secondary optical unit disposed downstream of the optical unit.

8. The lighting system of claim 1 in combination with a vehicle light source (6), the combination defining a vehicle headlamp.

9. A lighting system, comprising:
an optical unit comprising a plurality of light guides which are respectively provided for at least one light source and which respectively have an input coupling face, and wherein, on the output side, the light guides are connected via a common connecting portion of the optical unit, the connecting portion having an output face, pointing away from the light guides, for the light emerging from the light guides; and a holding frame for the optical unit, by means of which the optical unit is fastened to a printed circuit board, having the light sources, of the lighting system;

wherein a spacer arranged at a connecting side of the holding frame is provided for positioning the optical unit, the connecting side pointing away from the output face of the optical unit and the holding frame being connectable to the printed circuit board via the connecting side; and wherein a step face pointing to the spacer is embodied at a respective light guide, a respective light guide being supportable at the spacer by way of said step face.

10. The lighting system of claim 9, wherein, at a certain temperature, the step faces of the light guides abut against the spacer and a tensioning force is applied to the light guides.

11. The lighting system of claim 9, wherein a respective step face has a ring-shaped or substantially ring-shaped configuration and can be supported on the spacer with a closed or at least substantially closed line contact or area contact.

12. A lighting system, comprising:

an optical unit comprising a plurality of light guides which are respectively provided for at least one light source and which respectively have an input coupling face, and wherein, on the output side, the light guides are connected via a common connecting portion of the optical unit, the connecting portion having an output face, pointing away from the light guides, for the light emerging from the light guides; and a holding frame for the optical unit, by means of which the optical unit is fastened to a printed circuit board, having the light sources, of the lighting system;

wherein a spacer arranged at a connecting side of the holding frame is provided for positioning the optical unit, the connecting side pointing away from the output face of the optical unit and the holding frame being connectable to the printed circuit board via the connecting side; and wherein the spacer has a spring, the spring facilitating the spacer to be able to be supported in the holding frame and rendering possible an application of a spring force on said spacer in the direction of the printed circuit board.

13. A lighting system, comprising:

an optical unit comprising a plurality of light guides which are respectively provided for at least one light source and which respectively have an input coupling face, and wherein, on the output side, the light guides are connected via a common connecting portion of the optical unit, the connecting portion having an output face, pointing away from the light guides, for the light emerging from the light guides; and a holding frame for the optical unit, by means of which the optical unit is fastened to a printed circuit board, having the light sources, of the lighting system;

wherein a spacer arranged at a connecting side of the holding frame is provided for positioning the optical unit, the connecting side pointing away from the output face of the optical unit and the holding frame being connectable to the printed circuit board via the connecting side; and wherein at least one reference geometry is embodied on the holding frame or on the printed circuit board, the reference geometry passing through a continuous reference recess of the spacer and being immersed in a reference recess of at least one of the printed circuit board or of the holding frame.

\* \* \* \* \*